United States Patent [19]

Mirsky et al.

[11] Patent Number: 6,090,258
[45] Date of Patent: Jul. 18, 2000

[54] ION-EXCHANGE SPACER AND PROCESSES FOR THE PREPARATION THEREOF

[75] Inventors: Yelena Mirsky, Beer Sheva; Rami Messalem, Omer; Naphtali Daltrophe, Beer Sheva; Ora Kedem, Rehovot; Galina Saveliev, Beer Sheva, all of Israel

[73] Assignee: Ben Gurion University of the Negev Research and Development Authority, Beer Sheva, Israel

[21] Appl. No.: 09/057,471

[22] Filed: Apr. 9, 1998

[30] Foreign Application Priority Data

Apr. 10, 1997 [IL] Israel ............................. 120634

[51] Int. Cl.⁷ ................................... B01D 61/44
[52] U.S. Cl. ..................... 204/636; 204/638; 204/639; 204/279; 204/296; 521/28; 521/29
[58] Field of Search .................... 204/636, 638, 204/639, 279, 296; 521/28, 29

[56] References Cited

U.S. PATENT DOCUMENTS 3,219,567  11/1965  Lacey ....................................... 204/636
4,033,850  7/1977  Kedem et al. ........................... 204/301

*Primary Examiner*—Arun S. Phasge
*Attorney, Agent, or Firm*—Pillsbury Madison & Sutro LLP

[57] ABSTRACT

The invention provides a polymeric netting for use as an ion-conducting spacer in an electrodialysis stack having charged groups incorporated in a in polymeric coating applied thereto, imparting to the spacer an average ion exchange capacity of at least 0.25 meq/gr.

17 Claims, 3 Drawing Sheets

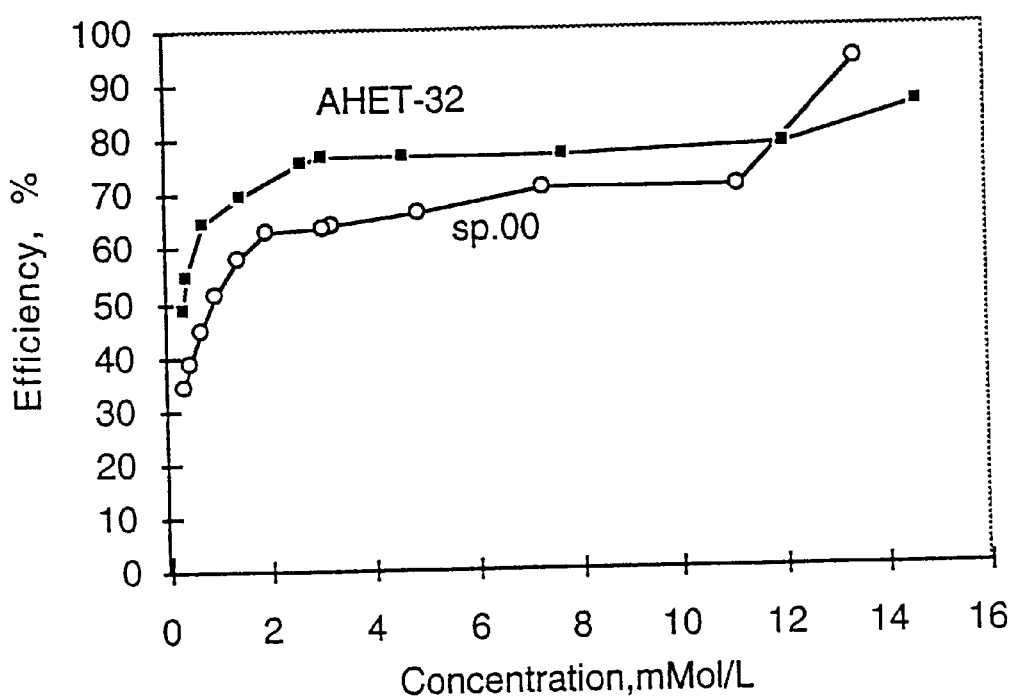
Fig.1 EFFICIENCY of SPACER AHET 32.
( Membranes IPCM-AMT,Vconst=3 Volt/cell)

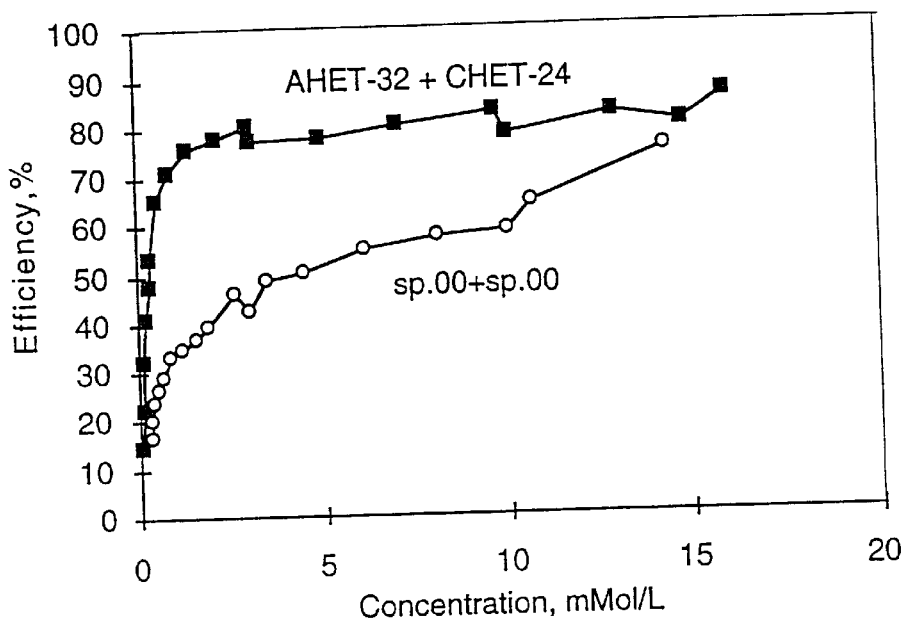
Fig. 2 EFFICIENCY of SPACERS AHET-32 + CHET-24.
(Membranes IPC- IPA.Vconst=3 Volt/cell.)
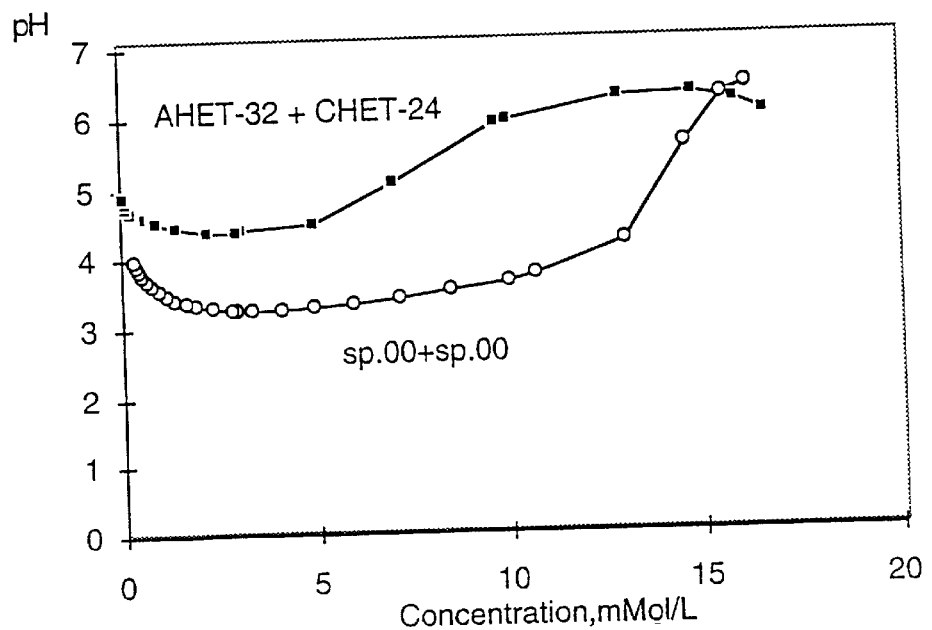
Fig. 3 pH VARIATIONS for SPACERS AHET-32+CHET-24.
(Membranes IPC- IPA.Vconst=3 Volt/cell)

Fig. 4 EFFICIENCY of SPACER AHOM-26.
(Membranes IPCM-IPA, Vconst=3 Volt/cell)
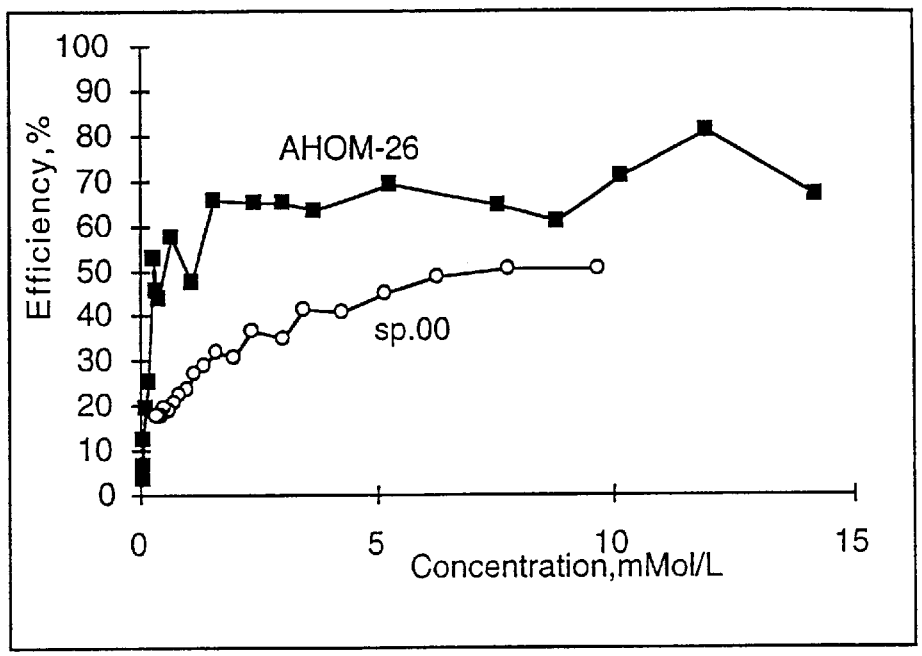
Fig.5 pH VARIATIONS for SPACER AHOM 26.
(Membranes IPCM-IPA, Vconst=3 Volt/cell)
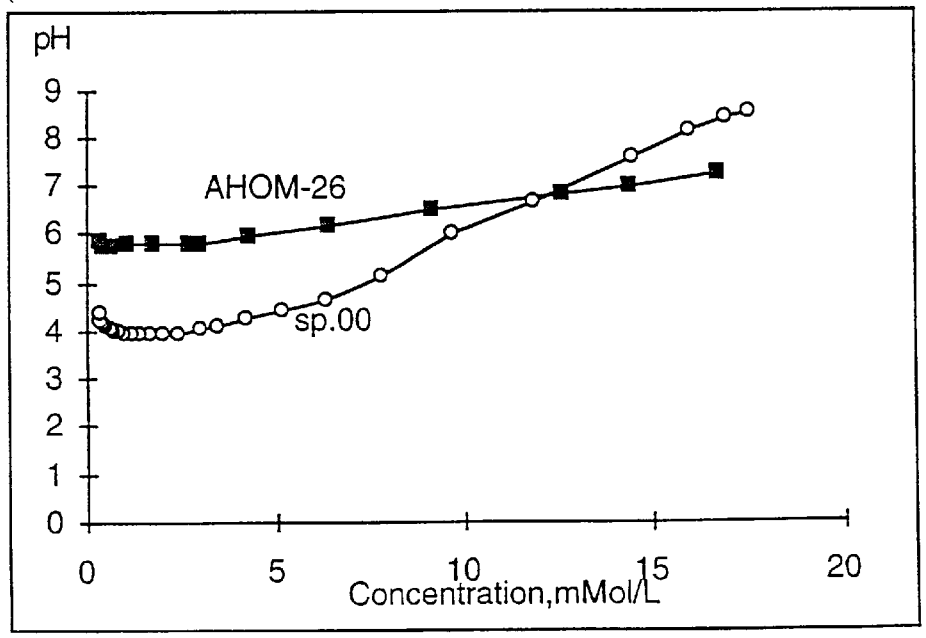

ION-EXCHANGE SPACER AND PROCESSES FOR THE PREPARATION THEREOF

The present invention relates to an ion conducting ion-exchange spacer for an electrodialysis stack and to processes for the preparation thereof.

As described, e. g., in U.S. Pat. No. 4,033,850 in conventional electrodialysis stacks there is provided a plurality of adjacent solution compartments, with alternating dialysate and brine compartments, separated by a cation exchange membrane from one adjacent compartment and by an anion exchange membrane from the second adjacent compartment, electrodes which are connected to a suitable current source being provided in the terminal compartments. The passage of a direct current through the dialysis stack results in depletion and enrichment, respectively of salt in adjacent compartments. The rate of desalination is roughly proportional to the electric current. An increase of the current density, i.e. of current per unit area of membrane, leads to an increased rate of desalination, but there exists an upper limit of useful current density due to polarisation. The phenomenon appears especially in the dialysate. Polarisation is a local change of concentration, resulting from ion-transport phenomena, bringing about a high ohmic resistance caused by depletion of salt concentration of the solution in the immediate vicinity of the membranes and by not too clear changes in the membranes themselves. Theoretically the limiting current is reached when the ion concentration in the solution close to the membrane surface approaches zero. This does not happen in practice as hydrogen and hydroxyl ions themselves can participate in the ion transport. This process termed "water splitting" results in losses of current efficiency. The upper practical limit of effective current is that at which "water splitting" commences. There are also induced changes of pH which promote precipitation of various substances on the membrane surfaces, an effect termed "fouling", causing membrane damage.

It is known that current efficiency can be increased by generating vortices in the liquid, resulting in a faster rate of diffusion of salt ions towards the membranes surfaces, replacing the removed ions. As many vortices as possible are generated and thus polarisation can be decreased but it cannot be eliminated. It is clear that polarisation phenomena is very much dependent on the dynamic conditions of flow.

Attempts have been made to decrease polarisation by the application of brief pulses of current in a direction opposite to that of the desalinating current. This too ameliorates but does not eliminate polarisation.

Conventional electrodialysis stacks suffer from additional drawbacks. Stacks consisting of hundreds of membranes must be dismantled even if a single membrane fails, and such membrane damage cannot be entirely avoided.

In British Patent Nos.: 796,149; 858,076 and 939,690 means are described for decreasing the ohmic resistance of dialysate compartments by the introduction into same of granulated ion-exchanger materials. If such material of one kind only is used, strong polarisation effects occur at the contact areas between cation exchange resin and anion-selective membrane and vice versa. If a mixed granulate is used no unbroken paths for cations in the cation-exchange resin and of anions in the anion exchange resin are provided. Such granulates complicate the construction of stacks and increase the lateral size. In U.S. Pat. Nos. 4,632,745 and 4,925,451 a mixed granulate is applied for the specific purpose of ultrapure water. According to yet another suggestion a spacer is provided comprising elongated cation exchange and elongated anion exchange particles formed to provide a porous body by means of an inert resin. Polarisation is not prevented as no continuous path is provided for either kind of ions.

In U.S. Pat. No. 4,033,850 there is inter alia described the use of ion conductive material threads formed into fabrics to create an ion exchange spacer, however in the ten years which have elapsed since the publication of said patent this type of spacer has not been applied in ED stacks since it is very difficult to produce on a commercial scale.

With this state of the art in mind, there is now provided according to the present invention a polymeric netting for use as an ion-conducting spacer in an electrodialysis stack having charged groups incorporated in a polymeric coating applied thereto, imparting to the spacer an average ion exchange capacity of at least 0.25 meq/gr.

Thus, according to the present invention a netting, widely used as spacer in ED, consisting of polypropylene, polyethylene or polyolefin copolymer or mixture thereof is coated with a solution containing soluble or crosslinked polymers and both heterogeneous and homogeneous coatings are obtained. The simplest heterogeneous coating contains ground anion-exchange particles suspended in an aqueous solution of polyvinyl alcohol (PVA), with hexamethoxymelamine as cross-linker. With regard to this embodiment it was surprising to find that one can coat the aqueous solution onto the hydrophobic polypropylene. It was also found that wetting is improved by pretreatment of the spacer in concentrated sulfuric acid. A homogeneous coating consisted of bromomethylated polysulfone, from organic solution. Amination of the bromomethylgroups in the dried spacer transformed it into an anion-exchanger.

Both heterogeneous and homogenous coatings were introduced into the diluate compartments of laboratory flow cells and bench scale ED stacks, as spacers. These ion-conducting spacers depressed polarisation and water splitting and thus, increased the efficiency of the desalination process. As described and exemplified hereinafter.

The present invention also provides a process for the preparation of a polymeric netting for use as an ion-conducting spacer in an electrodialysis stack having charged groups incorporated in a polymeric coating applied thereto comprising combining ground ion exchange resin particles in an aqueous solution of a hydrophilic polymer and applying said solution to a polymeric material of a commercial netting, such as used in a spacer, to coat the same, drying said coated polymeric material and cross-linking said hydrophilic polymer.

Furthermore, the invention provides a process for the preparation of a polymeric netting for use as an ion-conducting spacer in an electrodialysis stack having charged groups incorporated in a polymeric coating applied thereto comprising preparing a mixture of bromomethylated polysulfone, methylene chloride and N-methyl pyrrolidone, applying said mixture to a polymeric material of a commercial netting, such as used in a spacer, to coat the same, and reacting the same with an amine to effect the amination of said bromomethylated polysulfone to convert the same into an anion exchange polymer.

Also provided according to the present invention is a process for the preparation of a polymeric netting for use as an ion-conducting spacer in an electrodialysis stack having charged groups incorporated in a polymeric coating applied thereto comprising preparing a mixture of sulfonated polysulfone, methylene chloride and N-methyl pyrrolidone, applying said mixture to a polymeric material of a commercial netting, such as used in a spacer, to coat the same.

In an especially preferred embodiment of the present invention said polymeric coating is covalently-bonded to said spacer.

Detailed Description of the Invention

As is known, heterogeneous ion-exchange membranes, long used in electrodialysis, consist of small ion-exchange particles, usually ground ion-exchange resin, embedded in an inert, hydrophobic, polymeric matrix. If the fraction of resin particles is large enough, at least 50 w %, percolation of the ions which are counter-ions of the resin is possible, and perm-selective membranes are obtained. The electric resistance of these membranes is generally higher than that of the homogeneous membranes comprising of crosslinked, charged polymers. For the effective function of the conducting spacer, the local conductance in the coating has to be significantly higher than that of the surrounding solution. Ion-exchange resins will maintain a higher concentration of mobile ions and thus a higher conductance.

Permselectivity per se is not required. To achieve these properties, according to the present invention, ground ion-exchange resin is embedded in a hydrophilic polymer, e.g., in polyvinyl alcohol (PVA), which allows passage of ions. Ground anion-exchange or cation-exchange resin for anion-conducting or cation-conducting spacer respectively is used. The resin is dispersed in an aqueous solution of PVA, the spacer is coated and dried and the PVA is crosslinked by a suitable agent during the drying or subsequent curing. In order to keep the openings of the net undisturbed, air is preferably blown across the spacer before drying. One cycle of dipping and drying will generally not deposit a large enough amount of coating, and therefore the process is repeated. On industrial scale, repeated coating and drying can be carried out in one continuous process.

Various reagents are available for the cross-linking of PVA. Di-carboxylic acids have been used in the preparation of membranes, reactive dyes were used for binding to hydroxyls, cellulosic membranes and PVA were crosslinked with reactive dyes, also di-aldehydes can be used. For the cross-linking of the anion-exchange spacer. Hexamethoxymethylmelamine (HMMM) was chosen, which gives with acid catalysts, a stable, crosslinked structure.

Heterogeneous films were prepared by spreading the aqueous suspension containing the cross-linking agent on a glass plate and drying. The coating was chosen from compositions which gave stable films. The heterogeneous cation-exchange spacer can be crosslinked either by HMMM, by active dyes or mixtures thereof.

A homogeneous anion-conducting spacer was prepared by coating with bromomethylated polysulfone (BMPS). The coating was applied from a mixture of solvents, methylene chloride and N-methyl-pyrrolidone (NMP). Methylene chloride evaporates quickly and thus helps to solidify the coating quickly. NMP is an excellent solvent for PS and BMPS. The open, molecular coils existing in this solvent in solution and during the drying, help to give optimal mechanical properties to the dry films. The polymer was prepared by bromomethylation of UDEL polysulfone (PS). Mechanical stability is improved by the addition of PS. Amination with trimethylamine transforms the BMPS into an anion exchange polymer. A homogeneous cation-conducting coating was prepared from sulfonated polysulfone (SPS).

Ion-conducting spacers function by allowing the entrance of ions from solution into a more conducting phase, not only at the membrane surface, but in the whole volume of the solution. This improves the total conductance of the diluate cell, and more importantly, supplies the ions directly to the membrane, suppressing the ion depletion adjacent to the membrane surfaces. This, in turn, decreases water splitting at the anion-exchange membrane. Water splitting is a parasitic current generating hydroxyls and protons instead of removing salt. Thus the desalination process, at a given voltage, may be accelerated in two ways: higher current, by increased conductance and higher fraction of effective current, by suppressed water splitting.

The effect of the spacers is significant in dilute solutions, in which the relative conductance of the spacer is high. This concentration range is commercially important in the preparation of process water for power stations, as well as the preparation of ultra-pure water for the chemical and microelectronics industries.

After various modes of testing, it was decided to choose as decisive grading for the efficacy of spacers, the rate of desalting from 3 meq./lit to 0.3 meq./lit., at constant, practically applicable, voltage. Any enhancement of desalting rate, at constant voltage, can be due to decrease of ohmic resistance and/or to increased current efficiency. Looking at all the variations prepared, it turns out that the overall ion exchange capacity is decisive. A substantial decrease in desalination time was achieved with the simple and quite inexpensive coating described above, ground anion-exchanger in crosslinked PVA.

A specific effect was found with the heterogeneous ion-exchange membranes based on polyethylene, produced by the US Filter Co. These membranes are highly polarising, so far used only in conjunction with ion-exchange resins. The ion-conducting coated spacer improves their performance so that they become competitive with the expensive, homogeneous, commercial ion-exchange membranes.

So far, anion-conducting spacers were described which appear indeed to be most advantageous for practice. The strongest improvement in current efficiency is possible with an anion-conducting and a cation-conducting spacer, each positioned close to the corresponding membrane. This was indeed found and is described in example 4 hereinafter.

As stated in an especially preferred embodiment of the present invention the polymeric coating is covalently bound to the spacer material in order to further ensure that the coating does not peel off during use and thus increasing the useful lifetime of the modified spacer.

There are several ways to bind the polymer coating to the spacer which are applicable to both homogeneous and heterogeneous coatings.

A first way of achieving this bonding is to introduce reactive groups onto the surface of the spacer, and to bind the polymer coatings via interaction of functional groups on the polymer and the spacer. Numerous groups may be introduced onto the surface of polyolefin spacers. For example: amination by an ammonia plasma treatment (J.Membr. Science 53, 1990), carboxyl and hydroxyl groups by photoozonization, oxidation via chromic or permanganate salts (especially in acid), $H_2O_2$/transition metal salts, halogenation via free radical or polar processes, chloro or bromosulfonation, and radical promoted functionalization, to name a few preferred processes.

In preferred embodiments in which the groups introduced into the spacer are halogens (especially chloro and bromo), or sulfonyl halogens, they are optionally reacted further to amino, hydroxyl, carboxylic and sulfonic moieties. The amine, hydroxyl and carboxyl groups may, in addition, be further reacted to form groups chosen from isocyanates, glycidyl, reactive esters, acyl halides, halotriazines and diazines, hydroxymethyl ureas and melamines, and alkylmethoxy methylmelamines.

The reactive groups of the spacer are optionally reacted with functional groups on the coating polymer. Such groups include hydroxyl, carboxylic, amino, phenolic and haloalkyls. One preferred combination is the reaction of a hydroxy or amino group of the coating polymer with a bromo group on the spacer, to form an ether or imine bond, respectively. Another preferred combination is the reaction of a polymer coating containing bromo or chloromethylated groups with amino or hydroxyl or carboxylic acid groups on the spacer.

The polymer coating may, of course, be subsequently crosslinked through its thickness, or otherwise modified to introduce ionic groups, as described herein.

In preferred embodiments of the present invention, the coating contains particles of ion exchange resin. The ion exchange particles are preferably added to the solution of the coating polymer prior to the coating step.

A second way to achieve bonding is to effect grafting reactions of polymers via the generation of free radicals on the surface of the polyolefin and the subsequent polymerization of a monomer. The generation of free radicals is effected utilizing peroxides, hydroperoxides, azo compounds [water soluble and non-water soluble derivatives], oxidation reduction couples (e.g., $H_2O_2/Fe++$, or persulfate/metabisulfite, or cerium (IV) salts), radiation induced graft polymerization (gamma, beta, electron beam, and UV) alone, or in conjunction with sensitizers, absorbers and free radical sources (e.g., UV and $H_2O_2$ to form hydroxy radicals).

In an alternative grafting procedure, an organic molecule is bound to the polyolefin, and said organic molecule is then subsequently decomposed to form bound free radicals, which initiates monomer polymerization. An example of this approach is the chloro sulfonation or bromination of polypropylene, and reaction with an amine containing an azo or peroxide compound. The azo compound will decompose when heated, form free radicals and initiate monomer polymerization.

Grafting is alternatively effected through a bound olefinic monomer with a free vinyl group. The polymerization is then initiated through the bound olefin.

For example, a polypropylene spacer is brominated, reacted with ammonia and then with chlormethylated styrene. This bound styrene group is then optionally reacted with other monomer units via free radical polymerization to achieve a grafted coating.

Preferred grafting monomers are hydrophilic and preferably selected from the group consisting of hydroxyalkyl acrylates, hydroxyalkyl methacrylates, 2-hydroxy ethyl methacrylate and hydroxypropyl methacrylate and result in hydrophilic coatings, or they may be relatively hydrophobic with limited water solubility (e.g., vinyl acetate), and converted into hydrophilic groups, by for example, hydrolysis. Other monomers which introduce crosslinks (e.g., ethylene glycol dimethacrylate, diethylene glycol dimethacrylate, tetraethylene glycol dimethacrylate) and/or ionic groups (for example vinylsulfonic, acrylic acid, aminoethyl methacrylate, amino styrene and the methyl or ethyl quaternary derivatives of the amine monomers), may be used to form co- or tri-polymers.

The coating may be further reacted, as described in the present specification to introduce crosslinks and ionic charges. Water is the preferred solvent for these polymerizations, but water miscible solvents such as low molecular weight alcohols [e.g., ethyl, methyl and propyl alcohols] and ketones [e.g., acetone], may be added to increase monomer solubility.

The chemically grafted coating may contain particles, preferably added to the monomer solutions prior to application, and grafting to the spacer. The viscosity of this solution may be increased to keep the particles in place, by a polymer added to the monomer solution, which may also crosslink the polymerizing grafted polymer {e.g., via radical reactions}. For example, the monomer may be hydroxy ethyl methacrylate and the polymer polyvinyl alcohol or a polyvinyl alcohol copolymer, and the initiator a persulfate/metabisulfite couple. Polymers may also be added to the monomer solution to introduce ionic groups or mechanical strength without particles in the coating solution formulation. These polymers can react with the forming polymer via the free radicals generated during the polymerization process. Alternatively, they may not react, but form an interpenetrating network with the crosslinked network formed by the graft polymerization process.

While the invention will now be described in connection with certain preferred embodiments in the following examples and with reference to the accompanying figures, so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

BRIEF DESCRIPTION OF THE DRAWINGS

In the drawings:

FIG. 1 is a graphic representation of the efficiency of the spacer of Example 1;

FIG. 2 is a graphic representation of the efficiency of the spacers of Examples 1 and 3 as described in Example 4;

FIG. 3 is a graphic representation of the variation in the pH of the spacer of Example 1 and 3 as described in Example 4;

FIG. 4 is a graphic representation of the efficiency of the spacer of Example 5; and FIG. 5 is a graphic representation of the variation in the pH of the spacer of Example 5.

EXAMPLE 1

A. Preparation of Spacer with Heterogeneous Anion-Exchanger Coating (AHET-32)

A polypropylene netting "Vexar", (produced by DuPont), of thickness 0.6 mm was pretreated in concentrated technical sulphuric acid for 40 hours.

A solution of polyvinyl alcohol (PVA Hoechst, Germany, MW 125000, Mowiol 20-98), anion-exchanger (Purolite A 430 IP, Purolite Co. USA), and Hexamethoxymethylmelanine (HMMM, Cymel 303, Cyanamide, USA) was prepared in the following ratio 1:1.2: 0.56, for example 0.176 g PVA to 0.2 11 g anion-exchanger to 0.098 g HMMM. The PVA was previously prepared as an 4% aqueous solution with 10% w i-propanol.

This suspension was kept overnight. Two drops of 0.25 N $H_2SO_4$ were added until pH=3. The spacer was dipped into this mixture.

The interstices of the network were opened by an air stream and only the filaments of the spacer remained covered with layer of reaction mixture. The coating was crosslinked at 80° C. during 40 min. This procedure was carried out a few times.

This coated spacer has 9.5 mg coating per $cm^2$ (4.1 mg ion-exchanger/$cm^2$) and ion-exchange capacity 14.0 $\times 0^{-3}$ meq./$cm^2$. The spacer is designated AHET-32.

B. Testing of the Spacer AHET-32

The spacer was tested in a laboratory electrodialysis flow-through unit which has one cell pair with dimensions 1.5×15 cm (active membrane area). The temperature in the diluate vessel was kept constant by circulating the solution through a thermostatic bath. In this test a commercial homogeneous membrane AMT (ASAHI Glass Company) and a heterogeneous cation-exchange membrane denoted here IPC (US Filter Co) were used.

The test was carried out at constant voltage, 3 Volt across the test cell and linear velocity ~19 cm/sec.

The spacer decreased desalination time by 41% and increased current efficiency by ~8.3% as compared to uncoated spacer (FIG. 1).

Another testing with this spacer and heterogeneous membranes anion-exchange membrane IPA and cation-exchange membrane IPC (US Filter Co) decreased desalination time by ~43.6% and increased current efficiency by 23.6% as compared to uncoated spacer (Table 1).

The uncoated spacer was dipped into this mixture, and heated for a few times as described in example 1.

This coated spacer has 7.6 mg coating per $cm^2$ (2.90 mg ion-exchanger/$cm^2$) and ion-exchange capacity ~11.0.$10^{-3}$ meq./$cm^2$. It is designated AHET-23.

B. Testing of the Spacer AHET-23

The spacer was tested as described in example 1 with a heterogeneous modified cation-exchange membrane, denoted herein as IPCM and a homogeneous anion exchange membrane AMT (ASAHI Glass). It decreased desalination time by 60% and increased current efficiency by 20% (Table 1).

Another testing with this spacer and membranes IPCM-AMT decreased desalination time by 34% and increased current efficiency by 4.0%.

EXAMPLE 3

A. Preparation of Spacer with Heterogeneous Cation-Exchanger Coating (CHET-24)

A Vexar netting spacer is pretreated as in Example 2.

A coating solution of PVA, HMMM and cation-exchanger (Purolite Sodium Resonium Powder, Purolite Co., USA) of ratio 1: 0.56:1 is prepared, for example: 0.176 g PVA, 0.098 g HMMM and 0.176 g cation-exchanger.

This suspension was kept overnight. Two drops of 0.25 N $H_2SO_4$ were added until pH-3 and uncoated spacer was

TABLE 1

Characteristics of the spacers used in ED (3 mM to 0.3 mM) at a constant voltage of 3 V

| Spacer | Membrane | Desalination time Abs. value (min) | Efficiency at 0.3 mM/l Abs. value (min) | Output ($m^3/m^2$ day) | Desal. rate (meq./$m^2$ s) | Desal energy (kWh/$m^3$) |
|---|---|---|---|---|---|---|
| sp.00 | IPC-IPA | 85.9 | 34.4 | 3.81 | 0.119 | 0.632 |
| CHET24 | | 73.1 | 30.4 | 4.48 | 0.140 | 0.714 |
| AHET32 | | 48.4 | 58.0 | 6.77 | 0.211 | 0.375 |
| sp.00 + sp.00 | IPC-IPA | 123.2 | 34.0 | 2.66 | 0.083 | 0.639 |
| AHET32 + CHET 24 | | 50.2 | 71.1 | 6.52 | 0.204 | 0.306 |
| sp.00 | IPC-IPA | 126.23 | 27.9 | 2.6 | 0.081 | 0.79 |
| AHET 32 | | 49.55 | 47.9 | 6.61 | 0.207 | 0.454 |
| AHOM 26 | | 47.6 | 50 | 6.62 | 0.207 | 0.44 |
| sp.00 | IPCM-AMT | 58.07 | 53.2 | 5.64 | 0.176 | 0.408 |
| AHET 32 | | 34.27 | 61.5 | 9.56 | 0.299 | 0.353 |
| sp.00 | IPCM-AMT | 42.8 | 69.5 | 7.65 | 0.239 | 0.312 |
| AHET 23 | | 28.3 | 73.5 | 11.55 | 0.361 | 0.296 |

The uncoated spacer is designated sp.00

EXAMPLE 2

A. Preparation of Spacer with Heterogeneous Anion Exchanger Coating (AHET -23)

A pretreatment of uncoated polypropylene netting (Vexar) is carried out: the spacer is dipped into a solution of brominated polysulphone (1 % w) in methylenechloride and heated for 20 min. at 80° C.

A coating solution of PVA, HMMM, polyethyleneimine (PEI, Aldrich Chemical Co. USA, 50% w aq. solution, MW 750000) and anion-exchanger Purolite is prepared in the following ratio: 1: 0.56:0.1:1, for example 0.176 g PVA, 0.098 g HMMM, 0.0176 g PEI and 0.176 g anion-exchanger. Five drops of 0.5 N $H_2SO_4$ were added to obtain pH-3.

dipped into this mixture and heated for a few times as described in Example 1.

A final layer is added by dipping the coated spacer in a solution of dye (Procion Red MX-5B, Aldrich Co. USA, 0.5% in water) and dried at 80° C. for 30 min. The spacer is then immersed into a solution of 0.5N $Na_2CO_3$ and 0.5N $Na_2SO_4$ at 70° C. for 2 hours.

This spacer has 7.6 mg coating per $cm^2$, (3.0 mg cation exchanger/$cm^2$) and cation-exchange capacity of 11.0.$10^{-3}$ meq.!$cm^2$.lt is designated CHET-24.

B. Testing of Spacer CHET-24.

The spacer was tested with membranes IPC-IPA as in Example 1.

The desalination time decreased by ~15%, current efficiency decreased by 4% (Table 1)

EXAMPLE 4

A set of two coated spacers AHET-32 example 1 and CHET-24 example 3 was tested between membranes IPC-IPA and compared with two uncoated spacers.

The desalination time decreased by 59% and current efficiency increased more than double (FIG. 2).

FIG. 3. describes the pH at different concentrations for the set of coated spacers vs. the uncoated ones.

It can be seen that the pH of the diluate is more stable at a larger range of concentrations.

EXAMPLE 5

A. Preparation of Spacer with Homogeneous Coating (AHOM-26)

The uncoated spacer was dipped into a coating solution of bromomethylated polysulphone (BM) in N-methyl pyrrolidone (Riedel de Haen, 30% w) and methylene chloride (70%). The interstices of the coated spacer were opened with air stream as described in Example 1, and dried at 80° C. during 30 min. The procedure was repeated a few times.

The coated spacer was aminated in a solution of 35% trimethylamine (45% solution in water, Merck), 20% methanol and 45% distilled water for 2 days.

The spacer has 8.8 mg anion-exchanger per $cm^2$ and its ion-exchange capacity is $13.6.10^{-3}$ meq./$cm^2$. This spacer is designated AHOM-26.

B. Testing of Spacer AHOM-26.

The spacer was tested in the cell described in Example 1.

When the coated spacer is between membranes IPCM-IPA, the desalination time decreased by 62% and current efficiency increased by 22% as compared to original spacer (FIG. 4). The change in pH at different concentrations is described in FIG. 5. The pH of diluate is more stable for this spacer vs. the uncoated one.

EXAMPLE 6

The procedure of example 1 was repeated with the variation that the polypropylene netting was treated with uv radiation and bromine for 60 minutes. This process introduced bromo groups onto the surface of the spacer. The net was not dipped into the acid solution prior to coating, as done in Example 1. Instead, the spacer was dipped into the coating solution of example 1, adjusted to pH 9.0 and left for 2 hours and dried at 70° C. for 60 minutes. The spacer so coated was then dipped into another acidified coating solution of Example 1 and cured as described in the example. Tests were carried out on this heterogeneous anion exchange spacer as in Example 1B with similar results.

EXAMPLE 7

Example 6 was repeated using the coating solutions of Example 3 to form a cation exchanger coating. The testing was carried out as in Example 3B and gave the same good results as described in this example for the non-bound coating.

EXAMPLE 8

The spacer of Example 6 after bromination was immersed in a 10% ammonium hydroxide solution to convert some of the bromo to amino groups. To the aminated spacer, the coating and amination procedures of Example 5 were applied. In this case, the bromomethyl groups of the polymer reacted with the amino groups of the net, thus chemically binding the coating to the spacer. Testing of this spacer via the procedure of Example 5B gave similar results.

EXAMPLE 9

Instead of bromination, the spacer was oxidized on the surface with potassium permanganate to introduce hydroxyl and carboxylic acid groups. The coating and procedures of Example 5A and B were repeated with equally good results. The binding of the coating to the spacer occurred through the displacement of the bromo group of the bromomethylated polysulfone by the hydroxyl and/or carboxyl groups of the spacer.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A polymeric netting for use as an ion-conducting spacer in an electrodialysis stack having charged groups incorporated in a polymeric coating applied thereto, imparting to the spacer an average ion exchange capacity of at least 0.25 meq/gr.

2. A polymeric netting according to claim 1 wherein said polymeric material is selected from the group consisting of polypropylene, polyethylene, a polyolefin copolymer and mixtures thereof.

3. A polymeric netting according to claim I having ion-exchange resin particles incorporated in a polymeric coating applied thereto.

4. A polymeric netting according to claim 3 wherein said polymeric coating comprises a hydrophilic polymer.

5. A polymeric netting according to claim 4 wherein said polymer is cross- linked polyvinyl alcohol.

6. A polymeric netting according to claim 5 wherein said cross-linking is achieved with a cross-linking agent selected from the group consisting of hexamethoxymethylmelamine, active dyes and mixtures thereof.

7. A polymeric netting according to claim 1 wherein said polymeric coating comprises bromomethylated polysulfone.

8. A polymeric netting according to claim 1 wherein said spacer is thermo-coated with ground anion-exchange resin.

9. A polymeric netting according to claim 1, wherein said polymeric coating is covalently-bonded to said spacer.

10. A process for the preparation of a polymeric netting for use as an ion-conducting spacer in an electrodialysis stack having charged groups incorporated in a polymeric coating applied thereto comprising combining ground ion exchange resin particles in an aqueous solution of a hydrophilic polymer and applying said solution to a polymeric material of a commercial netting to coat the same, drying said coated polymeric material and cross-linking said hydrophilic polymer.

11. A process according to claim 10 wherein said polymer is cross-linked polyvinyl alcohol.

12. A process according to claim 11 wherein said cross-linking is achieved with a cross-linking agent selected from the group consisting of hexamethoxymethylmelamine, active dyes and mixtures thereof.

13. A process for the preparation of a polymeric netting for use as an ion-conducting spacer in an electrodialysis stack having charged groups incorporated in a polymeric coating applied thereto comprising preparing a mixture of bromomethylated polysulfone, methylene chloride and N-methyl pyrrolidone, applying said mixture to a polymeric material of a commercial netting to coat the same, and reacting the same with an amine to effect the amination of said bromomethylated polysulfone to convert the same into an anion exchange polymer.

14. A process according to claim 13 wherein said amine is trimethylamine.

15. A process for the preparation of a polymeric netting for use as an ion-conducting spacer in an electrodialysis stack having charged groups incorporated in a polymeric coating applied thereto comprising preparing a mixture of sulfonated polysulfone, methylene chloride and N-methyl pyrrolidone, applying said mixture to a polymeric material of a commercial netting to coat the same.

16. In an electrodialysis stack which includes an ion-exchange spacer, the improvement wherein said spacer comprises a polymeric netting having charged groups in a polymeric coating applied thereto imparting to the spacer an average ion-exchange capacity of at least 0.25 meq/gr.

17. The stack of claim 16 wherein the coating is cross-linked polyvinyl alcohol wherein the cross-linking is achieved with a cross-linking agent selected from the group consisting of hexamethoxymethylmelamine, active dyes and mixtures thereof.

* * * * *